United States Patent
Anderson et al.

(10) Patent No.: US 10,195,796 B2
(45) Date of Patent: Feb. 5, 2019

(54) SYSTEMS AND METHODS FOR DRAPE FORMING A CHARGE OF COMPOSITE MATERIAL

(71) Applicant: The Boeing Company, Chicago, IL (US)

(72) Inventors: Michael Robert Anderson, Renton, WA (US); John Michael Ligas, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 548 days.

(21) Appl. No.: 14/883,894

(22) Filed: Oct. 15, 2015

(65) Prior Publication Data
US 2017/0106607 A1 Apr. 20, 2017

(51) Int. Cl.
*B29C 70/44* (2006.01)
*B29C 70/34* (2006.01)
*B29L 31/30* (2006.01)

(52) U.S. Cl.
CPC ..... *B29C 70/342* (2013.01); *B29L 2031/3082* (2013.01)

(58) Field of Classification Search
None
See application file for complete search history.

(56) References Cited

U.S. PATENT DOCUMENTS

| | | | |
|---|---|---|---|
| 6,814,916 B2 | 11/2004 | Willden et al. | |
| 7,118,370 B2 | 10/2006 | Willden et al. | |
| 7,651,650 B2 | 1/2010 | Willden et al. | |
| 8,142,181 B2 | 3/2012 | Willden et al. | |
| 8,236,222 B2 | 8/2012 | Henderson et al. | |
| 2011/0127698 A1* | 6/2011 | Alenby | B29C 70/44 264/510 |
| 2012/0312459 A1 | 12/2012 | De Mattia | |

OTHER PUBLICATIONS

U.S. Appl. No. 14/295,884, filed Jun. 4, 2014, Coxon et al.

* cited by examiner

*Primary Examiner* — Monica A Huson
(74) *Attorney, Agent, or Firm* — D'Ascenzo Intellectual Property Law, P.C.

(57) ABSTRACT

Systems and methods for drape forming a charge of composite material are disclosed herein. The systems include a forming mandrel, a charge support structure, a flexible and resilient forming membrane, a base, and a vacuum source. The charge support structure includes a flexible and resilient charge support membrane, a membrane suspension device, and a release structure. The release structure operatively couples the charge support membrane to the membrane suspension device when a tension on a peripheral region of the charge support membrane is less than a threshold tension and releases the charge support membrane from the membrane suspension device when the tension is greater than the threshold tension. Alternatively, and in place of the charge support structure, the systems include a means for supporting the charge of composite material. The methods include methods of drape forming a charge of composite material.

20 Claims, 5 Drawing Sheets

SYSTEMS AND METHODS FOR DRAPE FORMING A CHARGE OF COMPOSITE MATERIAL

FIELD

The present disclosure relates generally to systems and methods for drape forming a charge of composite material and more particularly to systems and methods that include and/or utilize a charge support structure to operatively support the charge of composite material during drape forming thereof.

BACKGROUND

Historically, construction of composite parts that define non-planar surface contours has been a serial process in which a plurality of plies of composite material is located, layer-by-layer, on a forming mandrel. While such a process may be effective, it may be inefficient and/or costly to implement, especially with larger and/or more complex composite parts. As composite parts become more complex, such as may be the case for aircraft and/or portions thereof, a time required to complete such a layer-by-layer assembly may become significant.

More recently, drape-forming processes have been developed that permit layered charges of composite material to be formed and/or laid up on a flat, or at least substantially flat, surface and subsequently deformed to a final, or desired, shape. However, deformation of the layered charge may induce undesired buckles and/or wrinkles within the layered charge, and these buckles and/or wrinkles may preclude the use of a conventional drape forming processes in certain applications, such as aircraft construction. Thus, there exists a need for improved systems and methods for drape forming a charge of composite material.

SUMMARY

Systems and methods for drape forming a charge of composite material are disclosed herein. The systems include a forming mandrel, a charge support structure, a flexible and resilient forming membrane, a base, and a vacuum source. Alternatively, and in place of the charge support structure, the systems include a means for supporting the charge of composite material.

The forming mandrel includes a forming surface that is shaped to correspond to a non-planar surface contour of a composite part. The forming membrane extends across at least a portion of the charge support membrane. The base supports the forming mandrel and the charge support structure. In addition, the base and the forming membrane at least partially define an enclosed volume that contains the forming surface, at least a portion of the charge support structure, and at least a portion of the release structure. The vacuum source is configured to selectively apply a vacuum to the enclosed volume.

The charge support structure includes a flexible and resilient charge support membrane, a membrane suspension device, and a release structure. The charge support membrane is configured to at least temporarily and operatively support the charge of composite material during drape forming thereof. A central region of the charge support membrane extends across at least a portion of the forming surface. The membrane suspension device is configured to at least temporarily suspend a peripheral region of the charge support membrane. The release structure operatively couples the charge support membrane to the membrane suspension device when a tension on the peripheral region of the charge support membrane is less than a threshold tension and releases the charge support membrane from the membrane suspension device when the tension is greater than the threshold tension.

The methods include methods of drape forming a charge of composite material. The methods include applying a low-level vacuum to an enclosed volume to partially deform a charge of composite material around an edge of a forming surface that is defined by a forming mandrel. The methods further include, during the applying, supporting a first portion of the charge of composite material with the forming surface. The methods also include, during the applying, supporting a second portion of the charge of composite material with a charge support structure that is separate from the forming surface and that extends away from the forming surface. The methods further include increasing a vacuum level within the enclosed volume from the low-level vacuum to a high-level vacuum to conform the charge of composite material to the forming surface. The methods also include ceasing the supporting the second portion of the charge of composite material to permit the charge of composite material to conform to the forming surface. The ceasing is at least partially responsive to the increasing.

DESCRIPTION

Figure 1:
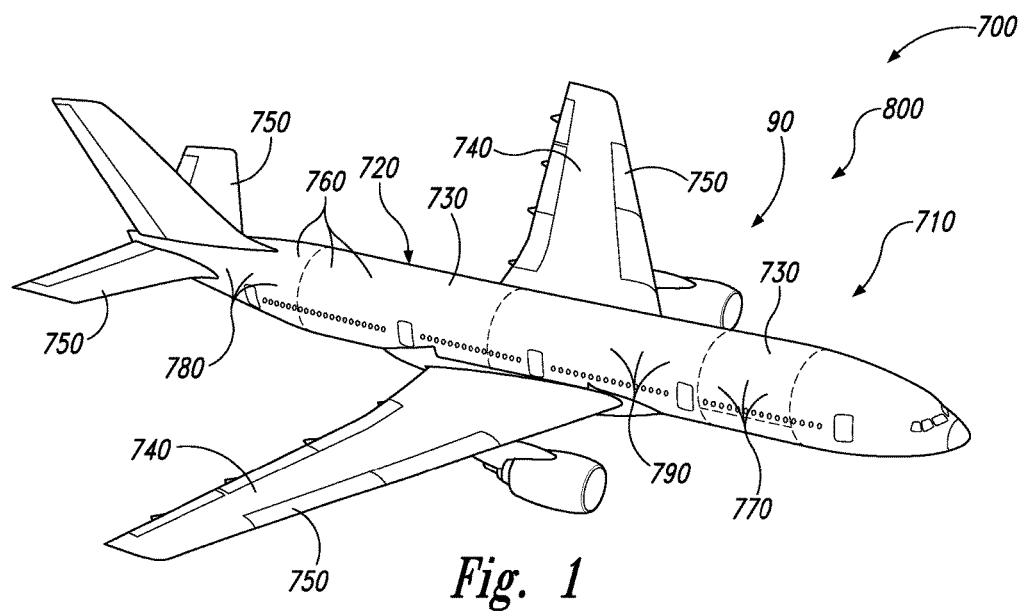
FIG. 1 is an example of an aircraft that includes a composite part that may be formed using the systems and methods according to the present disclosure.

FIGS. 1-7 provide examples of systems 10 and/or of methods 200, according to the present disclosure, for drape forming a charge of composite material to form and/or define a composite part 800. Elements that serve a similar, or at least substantially similar, purpose are labeled with like numbers in each of FIGS. 1-7, and these elements may not be discussed in detail herein with reference to each of FIGS. 1-7. Similarly, all elements may not be labeled in each of FIGS. 1-7, but reference numerals associated therewith may be utilized herein for consistency. Elements, components, and/or features that are discussed herein with reference to one or more of FIGS. 1-7 may be included in and/or utilized with any of FIGS. 1-7 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

Figure 2:
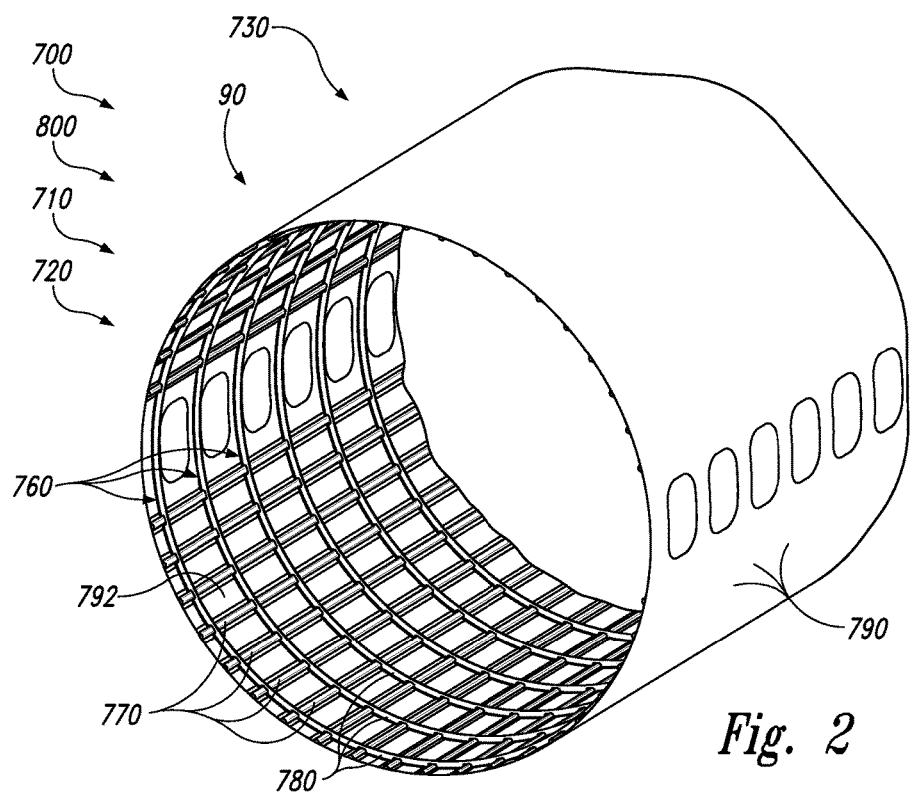
FIG. 2 is an example of a fuselage barrel that may form a portion of the aircraft of FIG. 1.

FIG. 1 is an example of an aircraft 700 that includes a composite part 800 that may be constructed utilizing a charge 90 of composite material. Charge 90 may be formed using the systems and methods according to the present disclosure. FIG. 2 is an example of a fuselage barrel 730 that may form a portion of aircraft 700 and includes composite part 800 that may be constructed utilizing charges 90. Aircraft 700 and/or composite part 800 thereof may include a plurality of skin segments 790 that may form, cover, and/or be an outer surface of any suitable portion of aircraft 700, and skin segments 790 may include, be formed from, and/or be constructed utilizing charges 90. As illustrated most clearly in FIG. 2, aircraft 700 also may include a plurality of stringers 770 that, together with a plurality of frames 780, may support an inner surface 792 of skin segments 790. A plurality of fillers 760 may extend between frames 780 and inner surface 792 and may form a portion of composite part 800. Similar to skin segments 790, stringers 770, frames 780, and/or fillers 760 may include, be formed from, and/or be constructed utilizing charges 90.

It is within the scope of the present disclosure that any suitable portion of aircraft 700 may be formed from and/or may be composite part 800. As examples, composite part 800 may form, or form a portion of, an airframe 710, a fuselage 720, fuselage barrel 730, a wing 740, and/or a stabilizer 750 of aircraft 700.

Figure 3:
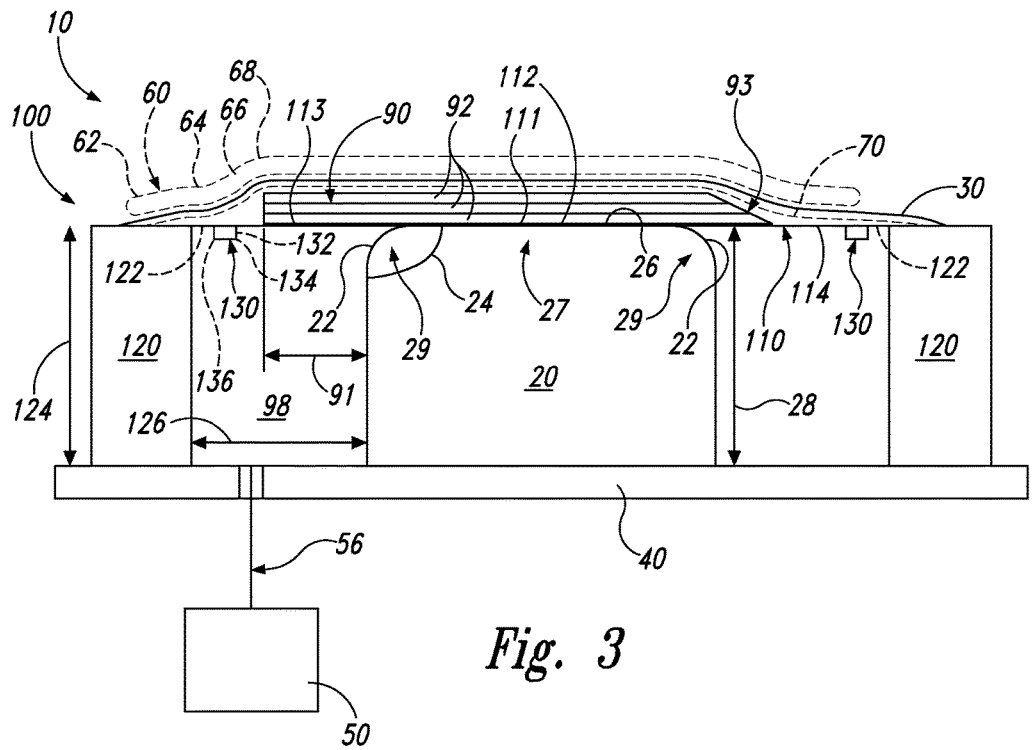
FIG. 3 is a schematic cross-sectional view of systems, according to the present disclosure, for drape forming a charge of composite material.
Figure 4:
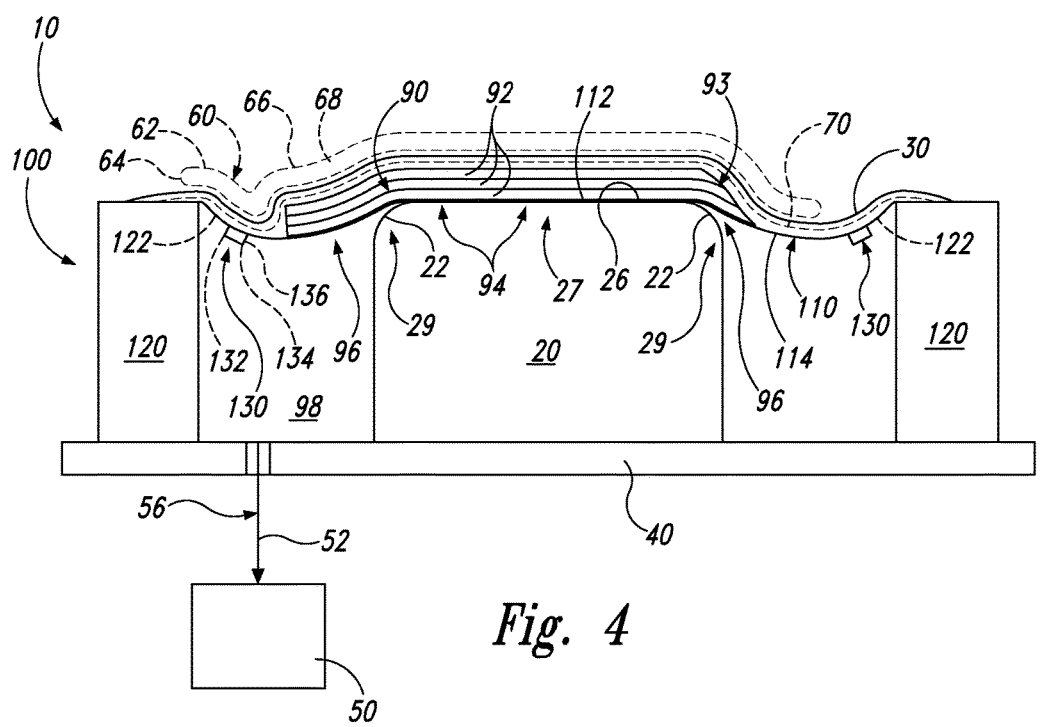
FIG. 4 is a schematic cross-sectional view of systems, according to the present disclosure, for drape forming a charge of composite material.
Figure 5:
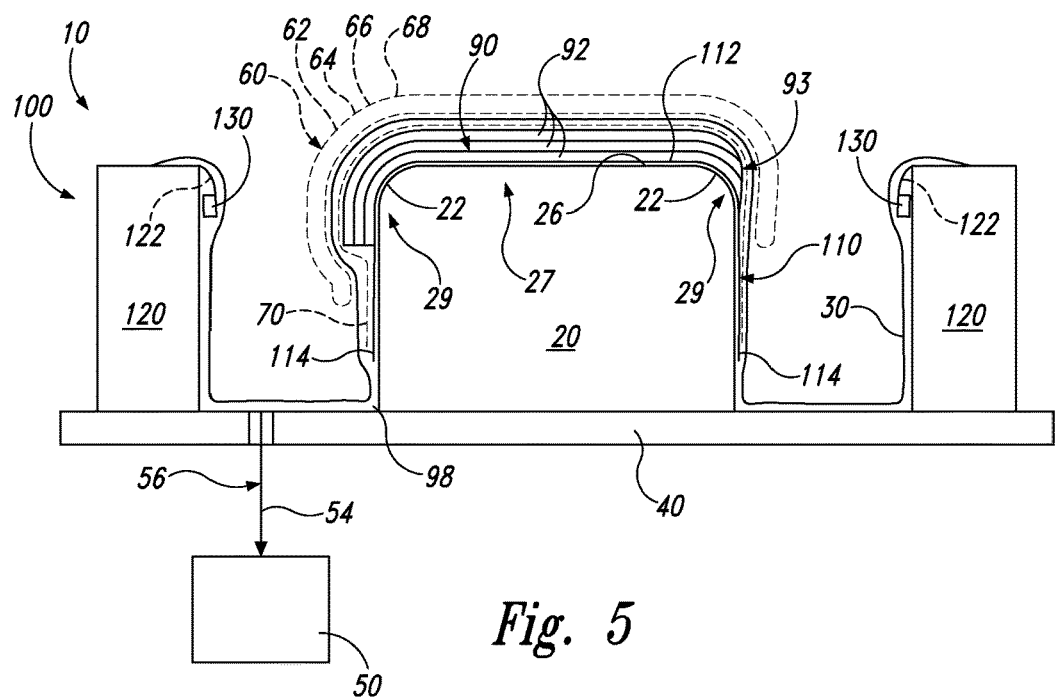
FIG. 5 is a schematic cross-sectional view of systems, according to the present disclosure, for drape forming a charge of composite material.
Figure 6:
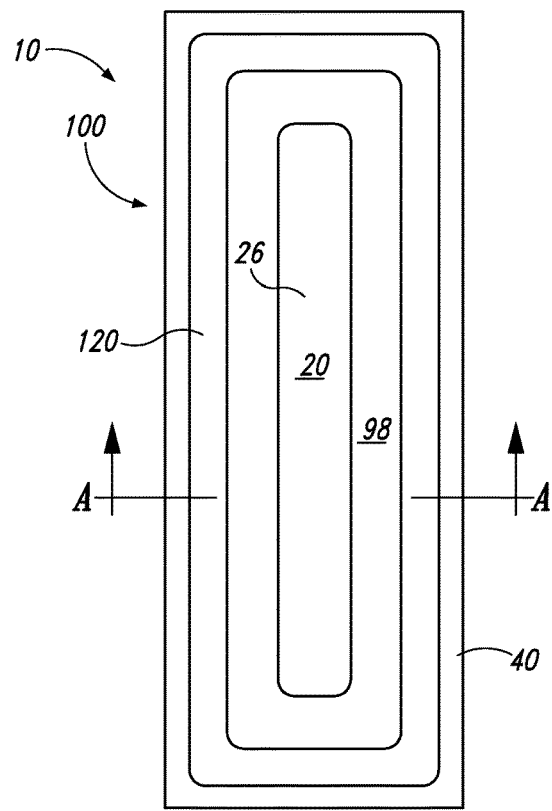
FIG. 6 is a schematic top view of a portion of the systems of FIGS. 3-5.

FIGS. 3-5 are schematic cross-sectional views of systems 10, according to the present disclosure, for drape forming a charge 90 of composite material, and FIG. 6 is a schematic top view of a portion of systems 10 of FIGS. 3-5. The views of FIGS. 3-5 may be taken along line A-A of FIG. 6, and systems 10 may be utilized to form, establish, and/or define a non-planar surface contour of a composite part, such as composite part 800 of FIGS. 1-2, that may include and/or utilize charge 90.

As illustrated in FIGS. 3-6, systems 10 include a forming mandrel 20, a charge support structure 100, and a base 40 that supports the forming mandrel 20 and the charge support structure 100. Forming mandrel 20 includes a forming surface 26 that is shaped to correspond to the surface contour of the composite part. Charge support structure 100 also may be referred to herein as a means for supporting charge 90.

As illustrated in FIGS. 3-5, charge support structure 100 includes a flexible and resilient charge support membrane 110, which also may be referred to herein as a charge support membrane 110, a membrane suspension device 120, and a release structure 130. As also illustrated in FIGS. 3-5, system 10 further includes a flexible and resilient forming membrane 30, which extends across at least a portion of charge support membrane 110, and a vacuum source 50, which is configured to selectively apply a vacuum to an enclosed volume 98, that is at least partially defined by base 40 and forming membrane 30.

During operation of system 10 and/or during drape forming of charge 90 by system 10, and as illustrated in FIG. 3, flexible and resilient charge support membrane 110 may be operatively coupled to membrane suspension device 120 via release structure 130. This may place charge support membrane 110 in tension, and charge support membrane 110 may be located such that a central region, or portion, 112 of charge support membrane 110 extends across and/or is supported by at least a portion of forming surface 26. In addition, the tension on charge support membrane 110 may permit a peripheral region, or portion, 114 of charge support membrane 110 to project from forming mandrel 20, to extend between membrane suspension device 120 and forming mandrel 20, and/or to be suspended above a void space that extends between membrane suspension device 120 and forming mandrel 20 and/or that defines at least a portion of enclosed volume 98.

With continued reference to FIG. 3, charge 90 of composite material may be placed within system 10 such that charge support membrane 110 at least temporarily and/or operatively supports charge 90. Additionally or alternatively, charge 90 may be placed within system 10 such that charge support membrane 110 extends between charge 90 and forming surface 26 and/or such that charge 90 is in direct physical contact with charge support membrane 110. In addition, charge 90 may be oriented such that a portion of charge 90 extends across, is supported by, and/or is directly supported by forming surface 26, while a remainder of charge 90 is suspended above the void space by charge support membrane 110, projects from forming mandrel 20 with charge support membrane 110, and/or extends from forming mandrel 20 and toward membrane suspension device 120. However, and as illustrated, charge 90 may not extend entirely across charge support membrane 110. This may facilitate subsequent forming of charge 90 by system 10, as discussed in more detail herein.

Forming membrane 30 may be placed within system 10 and/or may be oriented such that forming membrane 30 extends across charge 90, covers charge 90, covers an entirety of charge 90, extends across charge support membrane 110, covers charge support membrane 110, covers an entirety of charge support membrane 110, extends from membrane suspension device 120, is supported by membrane suspension device 120, is operatively attached to membrane suspension device 120, covers an entirety of membrane suspension device 120 and is operatively attached to base 40, and/or extends over the void space to at least partially define enclosed volume 98. Additionally or alternatively, forming membrane 30 also may be placed within system 10 such that charge 90 extends at least partially between charge support membrane 110 and forming membrane 30. As illustrated in FIG. 3, enclosed volume 98 includes and/or contains at least a portion of forming mandrel 20, forming surface 26, at least a portion of charge support membrane 110, at least a portion of release structure 130, and/or charge 90.

With continued reference to FIG. 3, and as illustrated in dashed lines, a heating assembly 60 optionally may be placed and/or oriented within system 10 such that the heating assembly may be utilized to heat charge 90. Heating of charge 90 may soften charge 90 and/or may facilitate subsequent shearing of a plurality of plies 92 of composite material, which each define charge 90, relative to one another during drape forming of charge 90 within system 10.

Subsequently, and as illustrated in FIG. 4, vacuum source 50 may be utilized to apply a low-level vacuum 52 to enclosed volume 98, such as via one or more vacuum conduits 56 that may extend therebetween. Examples of low-level vacuum 52 are disclosed herein. FIGS. 3-5 illustrate vacuum conduit 56 as extending through base 40 and/or as being in fluid communication with enclosed volume 98 via base 40. However, this is not required. As examples, vacuum conduits 56 may extend through and/or may be in fluid communication with enclosed volume 98 via forming mandrel 20, via membrane suspension device 120, and/or via forming membrane 30.

Application of low-level vacuum 52 to enclosed volume 98 may cause a pressure within enclosed volume 98 to decrease, thereby generating a pressure differential across forming membrane 30 (i.e., the pressure within enclosed volume 98 will be less than a pressure outside enclosed volume 98). This pressure differential may provide a motive force for partial deformation of charge 90 and/or may cause charge 90 to be partially conformed to forming surface 26 of forming mandrel 20. Stated another way, low-level vacuum 52 may provide a motive force for at least partial deformation of a first portion 94 of charge 90 around one or more edges 22 of forming surface 26; however, low-level vacuum 52 may be insufficient to cause a second portion 96 of charge 90 to be conformed to forming surface 26. The pressure differential also provides a motive force for deformation of charge support membrane 110, or at least peripheral region 114 thereof, thereby increasing the tension within the peripheral region.

As discussed in more detail herein, release structure 130 is configured to operatively couple charge support membrane 110 to membrane suspension device 120 when the tension within, or on, peripheral region 114 is less than a threshold tension. In addition, release structure 130 also is configured to release charge support membrane 110 from membrane suspension device 120 when the tension within, or on, peripheral region 114 is greater than the threshold tension. In the systems and methods disclosed herein, the low-level vacuum and/or the composition of release structure 130 generally will be selected such that charge support membrane 110 remains operatively coupled to membrane suspension device 120, via release structure 130, when the vacuum source 50 is applying low-level vacuum 52 to enclosed volume 98, as illustrated in FIG. 4. As also discussed in more detail herein, system 10 may be configured to maintain the low-level vacuum for at least a threshold holding time to permit plies 92 to shear relative to one another within charge 90.

Subsequently, and as illustrated in FIG. 5, vacuum source 50 may be utilized to apply a high-level vacuum 54 to enclosed volume 98, such as via vacuum conduit 56. High-level vacuum 54 is greater than, has a greater magnitude than, and/or produces a lower pressure within enclosed volume 98 than low-level vacuum 52 of FIG. 4, and examples of high-level vacuum 54 are disclosed herein. Application of high-level vacuum 54 causes the pressure within internal volume 98 to decrease further, thereby generating a greater pressure differential across forming membrane 30, providing a greater motive force for deformation of charge 90, and/or generating a greater tension within charge support membrane 110. This tension may be greater than the threshold tension above which release structure 130 releases charge support membrane 110 from membrane suspension device 120. Thus, and responsive to application of high-level vacuum 54 to enclosed volume 98, release structure 130 may permit separation of charge support membrane 110 from membrane suspension device 120, thereby permitting charge 90 to be conformed, or to be completely conformed, to forming surface 26.

As discussed, the systems and methods disclosed herein may be adapted, configured, designed, and/or constructed to permit defect-free, or at least substantially defect-free, drape forming of charge 90 (i.e., drape forming of charge 90 without, without significant, and/or with less than a threshold amount of buckling and/or wrinkling of charge 90). This at least substantially defect-free drape forming of charge 90 may be facilitated by several distinct structures, properties, characteristics, and/or functions of system 10.

In general, system 10 may be operated in a manner in which internal stresses and/or strains that are generated within charge 90, due to deformation thereof by system 10, preferentially cause shearing of plies 92 relative to one another as opposed to wrinkling and/or buckling of charge 90. Stated another way, system 10 may be operated in a manner in which a magnitude of the internal stresses and/or strains within charge 90 is sufficient to cause shearing of adjacent plies 92 relative to one another but is insufficient to cause delamination of adjacent plies 92, wrinkling of plies 92, wrinkling of charge 90, buckling of plies 92, and/or buckling of charge 90.

As an example, low-level vacuum 52 that partially conforms charge 90 to forming surface 26 may be selected such that internal stresses and/or strains within charge 90 preferentially cause the shearing of plies 92 relative to one another. As another example, a temperature to which charge 90 is heated by heating assembly 60 may be selected to decrease interfacial and/or adhesive forces between adjacent plies 92 and to preferentially facilitate shearing of adjacent plies 92 relative to one another. As yet another example, and as illustrated in FIG. 3, charge support structure 100 may be configured to maintain charge 90 in a flat, planar, or at least substantially planar conformation during initial heating of charge 90 by heating assembly 60, thereby restricting deformation of charge 90 until low-level vacuum 52 is applied to internal volume 98, as illustrated in FIG. 4. As another example, low-level vacuum 52 (of FIG. 4) and/or high-level vacuum 54 (of FIG. 5) may be applied in a controlled, directed, designated, staged, and/or ramped manner, thereby causing deformation of charge 90 to occur at a correspondingly controlled, directed, designated, staged, and/or ramped rate.

Charge support membrane 110 may include and/or be any suitable flexible and/or resilient structure that may be adapted, configured, designed, and/or constructed to at least temporarily and/or operatively support charge 90 during operation of system 10. As examples, charge support membrane 110 may include and/or be an elastomeric charge support membrane and/or a polymeric charge support membrane. As additional examples, charge support membrane 110 additionally or alternatively may include and/or be a charge support film and/or a thin charge support film.

Charge support membrane 110 may be configured to permit and/or facilitate fluid flow between a side of charge support membrane 110 that faces, or faces toward, forming surface 26 and a side of charge support membrane 110 that faces, or faces toward, charge of composite material 90. Such a configuration may facilitate evacuation of, or evacuation of an entirety of, enclosed volume 98 by vacuum source 50 when release structure 130 operatively couples charge support membrane 110 to membrane suspension device 120, as illustrated in FIGS. 3-4. As examples, charge-support membrane 110 may include and/or be a perforated charge support membrane and/or a gas-permeable charge-support membrane.

It is within the scope of the present disclosure that charge support membrane 110 may be formed from a charge support membrane material that is configured for direct physical contact with charge 90. As examples, the charge support membrane material may contact charge 90 without damage to charge 90 and/or without contamination of charge 90. Additionally or alternatively, it is also within the scope of the present disclosure that a release film may extend between charge 90 and charge support membrane 110 and/or may prevent direct physical contact between charge 90 and charge support membrane 110, may prevent damage to charge 90 by charge support membrane 110, and/or may prevent contamination of charge 90 by charge support membrane 110. Examples of the release film are disclosed herein with reference to release film 70.

Membrane suspension device 120 may include and/or be any suitable structure that may be adapted, configured, designed, and/or constructed to at least temporarily suspend peripheral region 114 of charge support membrane 110, as illustrated in FIGS. 3-4. As an example, membrane suspension device 120 may include and/or be a rigid membrane suspension body. Under these conditions, release structure 130 may operatively couple, or directly and operatively couple, charge support membrane 110 to the rigid membrane suspension body when the tension within charge support membrane 110 is less than the threshold tension.

As another example, and as illustrated in FIG. 6, membrane suspension device 120 may extend around, or may extend around an entirety of, forming mandrel 20. As yet another example, and as illustrated in FIGS. 3-5, membrane suspension device 120 may include a flexible extension region 122. Flexible extension region 122 may extend from a remainder of membrane suspension device 120, may extend from the rigid membrane suspension body, may extend within enclosed volume 98, and/or may extend toward forming mandrel 20. Under these conditions, release structure 130 may operatively couple, or directly and operatively couple, charge support membrane 110 to flexible extension region 122 when the tension within charge support membrane 110 is less than the threshold tension.

It is within the scope of the present disclosure that membrane suspension device 120 may be configured to permit fluid communication between a portion of enclosed volume 98 that extends between charge support membrane 110 and forming membrane 30 and a portion of enclosed volume 98 that extends between charge support membrane 110 and base 40. Such a configuration may facilitate evacuation of, or evacuation of an entirety of, enclosed volume 98 by vacuum source 50 when release structure 130 operatively couples charge support membrane 110 to membrane suspension device 120, as illustrated in FIGS. 3-4. It is also within the scope of the present disclosure that enclosed volume 98 may be at least partially defined, or bounded, by membrane suspension device 120, as illustrated in FIGS. 3-5. However, this is not required.

As illustrated in FIG. 3, membrane suspension device 120 and/or the rigid membrane suspension body thereof may extend a body distance 124 from base 40. Similarly, forming mandrel 20 may extend a mandrel distance 28 from base 40. In general, body distance 124 may be equal to mandrel distance 28 and/or may be at least as large as mandrel distance 28. Additionally or alternatively, body distance 124 may be within a threshold distance difference of mandrel distance 28 (i.e., body distance 124 may be matched to mandrel distance 28 to within the threshold distance difference). Such a configuration may permit charge support structure 100 to retain charge 90 in a planar, or at least substantially planar, conformation prior to application of vacuum to enclosed volume 98 by vacuum source 50, as illustrated in FIG. 3. Examples of the threshold distance difference include threshold distance differences of less than 5 percent of the mandrel distance, less than 10 percent of the mandrel distance, less than 15 percent of the mandrel distance, or less than 20 percent of the mandrel distance.

As also illustrated in FIG. 3, a spacing 126 between membrane suspension device 120 and forming mandrel 20 may be sized and/or selected to provide clearance for charge 90. As an example, spacing 126 may be selected to be greater than a flange length 91 of charge 90. Such a configuration may permit charge 90 to be formed around forming surface 26 of forming mandrel 20 without contacting, or being impeded by, membrane suspension device 120. Examples of spacing 126 include spacings that are at least 1, at least 1.25, at least 1.5, at least 2, or at least 3 times larger than flange length 91. Additional examples of spacing 126 include spacings that are less than 5, less than 4.5, less than 4, less than 3.5, less than 3, less than 2.5, less than 2, or less than 1.5 times larger than flange length 91. A specific value for spacing 126 may be selected based, at least in part, on one or more of a desired volume for enclosed volume 98, a desired forming rate for charge 90, a desired rate at which the vacuum may be applied to enclosed volume 98, and/or a desired rate at which the pressure may be decreased within enclosed volume 98.

Release structure 130 may include any suitable structure that may be adapted, configured, designed, and/or constructed to operatively couple charge support membrane 110 to membrane suspension device 120 when the tension on peripheral region 114 is less than the threshold tension and to release charge support membrane 110 from membrane suspension device 120 when the tension on peripheral region 114 is greater than the threshold tension. In addition, and as discussed, membrane suspension device 120 and release structure 130 together may be configured to maintain charge support membrane 110 in tension when the tension on peripheral region 114 is less than the threshold tension.

As an example, and prior to application of vacuum to enclosed volume 98 (as illustrated in FIG. 3), charge support membrane 110 may include a supported region 111 and an unsupported region 113. Supported region 111 may support charge 90 and also may be supported by forming surface 26. Supported region 111 may include at least a portion of central region 112 of charge support membrane 110. Unsupported region 113 also may support charge 90 but may not extend across forming surface 26, may not be supported by forming surface 26, and/or may extend and/or project away from forming surface 26. In this configuration, and as illustrated, membrane suspension device 120 and release structure 130 together may be configured to maintain unsupported region 113 in a planar, or at least substantially planar, conformation.

As an example, membrane suspension device 120 and release structure 130 together may be configured to maintain unsupported region 113 within a threshold distance of being coplanar with supported region 111 and/or central region 112 of charge support membrane 110. Examples of the threshold distance include distances of less than 1 centimeter (cm), less than 2 cm, less than 3 cm, less than 4 cm, and/or less than 5 cm.

It is within the scope of the present disclosure that release structure 130 may be a separate structure that is distinct from charge support membrane 110 and/or from membrane suspension device 120. As an example, release structure 130 may include and/or be an adhesive 132 that operatively couples charge support membrane 110 to membrane suspension device 120. Adhesive 132, when present, may be configured to operatively attach charge support membrane 110 to membrane suspension device 120 when the tension within peripheral region 114 is less than the threshold tension and to permit separation of charge support membrane 110 from membrane suspension device 120 responsive to the tension being greater than the threshold tension. As examples, adhesive 132 may be configured to shear, delaminate, and/or fail to permit the separation. Examples of adhesive 132 include an adhesive tape and/or a double-sided tape. Adhesive 132 also may be referred to herein as an adhesive surface 132 and/or as a tacky surface 132.

Additionally or alternatively, it is also within the scope of the present disclosure that release structure 130 may form a portion of charge support membrane 110. As an example, release structure 130 may include and/or be at least a portion of peripheral region 114, which may be configured to tear responsive to the tension being greater than the threshold tension. As a more specific example, peripheral region 114 may include a plurality of failure points 134, such as a plurality of perforations, and peripheral region 114 may be configured to tear along the plurality of failure points 134.

Additionally or alternatively, it is also within the scope of the present disclosure that release structure 130 may form a portion of membrane suspension device 120. As an example, release structure 130 may include and/or be a mechanical release structure 136, such as any suitable clamp and/or clip, that is operatively coupled to and/or that forms a portion of membrane suspension device 120.

While not required, release structure 130 may include and/or be a fluid-permeable release structure 130. Such a configuration may permit evacuation of a region of enclosed volume 98 that extends between charge support membrane 110 and flexible and resilient forming membrane 30 prior to separation of charge support membrane 110 from membrane suspension device 120

As discussed, system 10 may include heating assembly 60, which may be configured to selectively heat at least a portion of charge of composite material 90 to a forming temperature. As an example, heating assembly 60 may include, or be, a heat blanket 62. Heat blanket 62 may extend across forming membrane 30 and/or may be oriented within system 10 such that forming membrane 30 extends between heat blanket 62 and charge 90. As another example, heating assembly 60 also may include and/or be a heat lamp 64. Additional examples of heating assembly 60 include a mandrel heating assembly, which is configured to heat forming mandrel 20, and/or a fluid heating assembly, which is configured to heat a fluid, such as air, that extends within enclosed volume 98 and/or to convey a heated fluid within enclosed volume 98.

Heating assembly 60 may include a temperature controller 66. Temperature controller 66 may be configured to regulate a temperature of charge 90 and/or to maintain the temperature of charge 90 at the forming temperature. Temperature controller 66 may include a temperature detector 68. Temperature detector 68 may be configured to measure the temperature of charge 90, and temperature controller 66 may control the temperature of charge 90 based, at least in part, on the measured temperature. It is within the scope of the present disclosure that system 10, heating assembly 60, and/or temperature controller 66 thereof may include any suitable number of temperature detectors 68. As an example, system 10 may include a plurality of temperature detectors 68, with each temperature detector 68 being configured to measure the temperature of a corresponding portion of charge 90. Examples of temperature detector 68 include any suitable thermocouple and/or resistance temperature detector (RTD).

The forming temperature may include and/or be any suitable temperature. As an example, the forming temperature may be at least 30° C., at least 35° C., at least 40° C., at least 45° C., at least 50° C., at least 55° C., and/or at least 60° C. Additionally or alternatively, the forming temperature also may be less than 400° C., less than 350° C., less than 300° C., less than 250° C., less than 200° C., less than 150° C., less than 140° C., less than 130° C., less than 120° C., less than 110° C., less than 100° C., less than 90° C., less than 80° C., less than 70° C., less than 65° C., less than 60° C., less than 55° C., less than 50° C., and/or less than 45° C.

As illustrated in dashed lines in FIG. 3, system 10 further may include a release film 70. Release film 70 may extend between forming membrane 30 and charge 90 and/or may be configured to restrict contact, or direct physical contact, between forming membrane 30 and charge 90. Release film 70 may be in direct, or direct physical, contact with charge 90, and a material and/or composition of release film 70 may be selected to permit the direct, or direct physical, contact with charge 90 without damage to and/or contamination of charge 90. An example of release film 70 includes a fluoropolymer film.

Forming membrane 30 may include any suitable structure that may be adapted, configured, designed, constructed, selected, formulated, and/or synthesized to extend across charge support membrane 110 to at least partially form, or define, enclosed volume 98, and/or to deform upon application of vacuum to enclosed volume 98, thereby facilitating deformation of charge 90, as discussed herein. As examples, forming membrane 30 may include and/or be an elastomeric forming membrane, a thin forming membrane, a thin film forming membrane, a vacuum bag, a fluid-impervious forming membrane, and/or an at least substantially fluid-impervious forming membrane.

Vacuum source 50 may include and/or be any suitable structure that may be adapted, configured, designed, and/or constructed to selectively apply the vacuum to enclosed volume 98. As examples, vacuum source 50 may include and/or be a vacuum pump, a venturi pump, a cyclone pump, a positive displacement pump, a momentum transfer pump, a regenerative pump, and/or an entrapment pump.

As discussed, vacuum source 50 may be configured to provide, or to apply, a range of different vacuums, or vacuum levels, to enclosed volume 98. This range of different vacuums can include at least low-level vacuum 52 of FIG. 4 and high-level vacuum 54 of FIG. 5. Examples of low-level vacuum 52 include vacuum levels of at least 0.5 kilopascals (kPa), at least 1 kPa, at least 1.5 kPa, at least 2 kPa, at least 2.5 kPa, at least 3 kPa, at least 3.5 kPa, at least 4 kPa, at least 5 kPa, at least 6 kPa, and/or at least 7 kPa. Additionally or alternatively, low-level vacuum 52 may be is less than 20 kPa, less than 18 kPa, less than 16 kPa, less than 14 kPa, less than 12 kPa, less than 10 kPa, less than 8 kPa, less than 7 kPa, less than 6 kPa, less than 5 kPa, and/or less than 4 kPa. Examples of high-level vacuum 54 include vacuum levels of at least 30 kilopascals (kPa), at least 40 kPa, at least 50 kPa, at least 60 kPa, at least 70 kPa, at least 80 kPa, at least 90 kPa, and/or at least 100 kPa.

As discussed, vacuum source 50 may be configured to increase, to ramp, or to progressively ramp, the vacuum between low-level vacuum 52 and high-level vacuum 54. As examples, vacuum source 50 may ramp the vacuum at a ramp rate of at least 5 kilopascals per minute (kPa/min), at least 6 kPa/min, at least 7 kPa/min, at least 8 kPa/min, at least 9 kPa/min, at least 10 kPa/min, at least 11 kPa/min, at least 12 kPa/min, at least 13 kPa/min, at least 14 kPa/min, and/or at least 15 kPa/min. Additionally or alternatively, the ramp rate also may be less than 100 kPa/min, less than 90 kPa/min, less than 80 kPa/min, less than 70 kPa/min, less than 60 kPa/min, less than 50 kPa/min, less than 40 kPa/min, less than 30 kPa/min, less than 20 kPa/min, less than 18 kPa/min, less than 16 kPa/min, less than 14 kPa/min, less than 12 kPa/min, and/or less than 10 kPa/min. Such a configuration may permit controlled deformation of charge 90 and/or may permit plies 92 to shear relative to one another when charge 90 is conformed to forming surface 26, as discussed herein.

Vacuum source 50 also may be configured to maintain the vacuum at, or near, a given vacuum level, such as low-level vacuum 52, for at least a threshold holding time. Examples of the threshold holding time include times of at least 30 seconds, at least 45 seconds, at least 1 minute, at least 2 minutes, at least 3 minutes, at least 4 minutes, at least 5 minutes, and/or at least 6 minutes. Additionally or alternatively, the threshold holding time also may be less than 10 minutes, less than 9 minutes, less than 8 minutes, less than 7 minutes, less than 6 minutes, less than 5 minutes, less than 4 minutes, and/or less than 3 minutes. Such a configuration may provide time for plies 92 to shear relative to one another during deformation of charge 90, as discussed herein.

Forming mandrel 20 may include and/or be any suitable structure that may include and/or define forming surface 26. As examples, forming mandrel 20 may include and/or be an elongate forming mandrel and or a rigid forming mandrel.

Forming surface 26 may include and/or be any suitable surface that may be defined by forming mandrel 20, that may be configured to receive charge 90, and/or that may be configured to define the non-planar surface contour of the composite part. Forming surface 26 also may be referred to herein as a non-planar forming surface 26.

As examples, forming surface 26 may include and/or be an elongate forming surface, an arcuate forming surface, and/or a non-planar forming surface. As a more specific example, forming surface 26 may be utilized to form any suitable in-plane and/or out-of-plane curve and/or contour along the length of charge 90. As another more specific example, and as illustrated in FIGS. 3-5, forming surface 26 may include a planar, or at least substantially planar, region 27 and an arcuate region 29 that extends from planar region 27. As illustrated, arcuate region 29 may extend away from planar region 27 and/or toward base 40. Arcuate region 29 may include and/or define edge 22 of forming mandrel 20 and may have, or define, a radius of curvature of less than 1 cm, less than 2 cm, less than 3 cm, less than 4 cm, less than 5 cm, less than 6 cm, less than 8 cm, less than 10 cm, less than 15 cm, and/or less than 20 cm. Additionally or alternatively, arcuate region 29 also may have, or define, an angle of curvature 24 of at least 30 degrees, at least 45 degrees, at least 60 degrees, at least 75 degrees, at least 90 degrees, and/or substantially 90 degrees.

Charge 90 of composite material may include and/or be any suitable structure that may be formed, deformed, and/or have a surface contour thereof defined by system 10 and/or that may include the plurality of plies 92 of composite material. Charge 90 may include any suitable number of plies 92, which also may be referred to herein as layers 92. As examples, charge 90 may include at least 5, at least 10, at least 20, at least 40, at least 60, at least 80, and/or at least 100 plies 92. Additionally or alternatively, charge 90 may include fewer than 200, fewer than 180, fewer than 160, fewer than 140, fewer than 120, fewer than 100, fewer than 80, and/or fewer than 60 plies 92.

Charge 90 and/or plies 92 thereof also may include, be formed from, and/or be defined by any suitable composite material. Examples of the composite material include a fiberglass, a fiberglass cloth, a carbon fiber, a carbon fiber cloth, a cloth, a pre-impregnated (pre-preg) composite material, a resin material, a thermos-set resin material, a cyanate ester, a phenolic material, a thermoplastic, and/or an epoxy.

It is within the scope of the present disclosure that plies 92 may be coextensive, or at least substantially coextensive, within charge 90 at least prior to charge 90 being conformed to forming surface 26 by system 10 (i.e., that each ply 92 in charge 90 may have the same, or at least substantially the same, size). Alternatively, it is also within the scope of the present disclosure that charge 90 may include at least a first ply 92 that has, or includes, a different size than at least a second ply 92. As an example, and as illustrated in FIGS. 3-5 at 93, charge 90 may include a tapered region. As illustrated, a number of plies 92 of composite material within tapered region 93 may progressively decrease around edge 22 of forming mandrel 20. Such a configuration may be desirable for certain composite parts 800; however, it may be difficult to form such charges 90 utilizing conventional drape forming systems and methods that do not include and/or utilize charge support structures 100 according to the present disclosure.

Base 40 may include any suitable structure that may support forming mandrel 20, that may support charge support structure 100, and/or that may at least partially define enclosed volume 98. As examples, base 40 may include and/or be a rigid base 40, an at least substantially rigid base 40, a metallic base 40, and/or a polymeric base 40. It is within the scope of the present disclosure that base 40 may support forming mandrel 20 and/or charge support structure 100 in any suitable manner. As an example, base 40 may be separate from and operatively attached to forming mandrel 20 and/or charge support structure 100. As another example, base 40 may form a portion of and/or be defined by forming mandrel 20 and/or membrane suspension device 120. As a more specific example, base 40, forming mandrel 20, and/or membrane suspension device 120 may include and/or be a monolithic structure.

Figure 7:
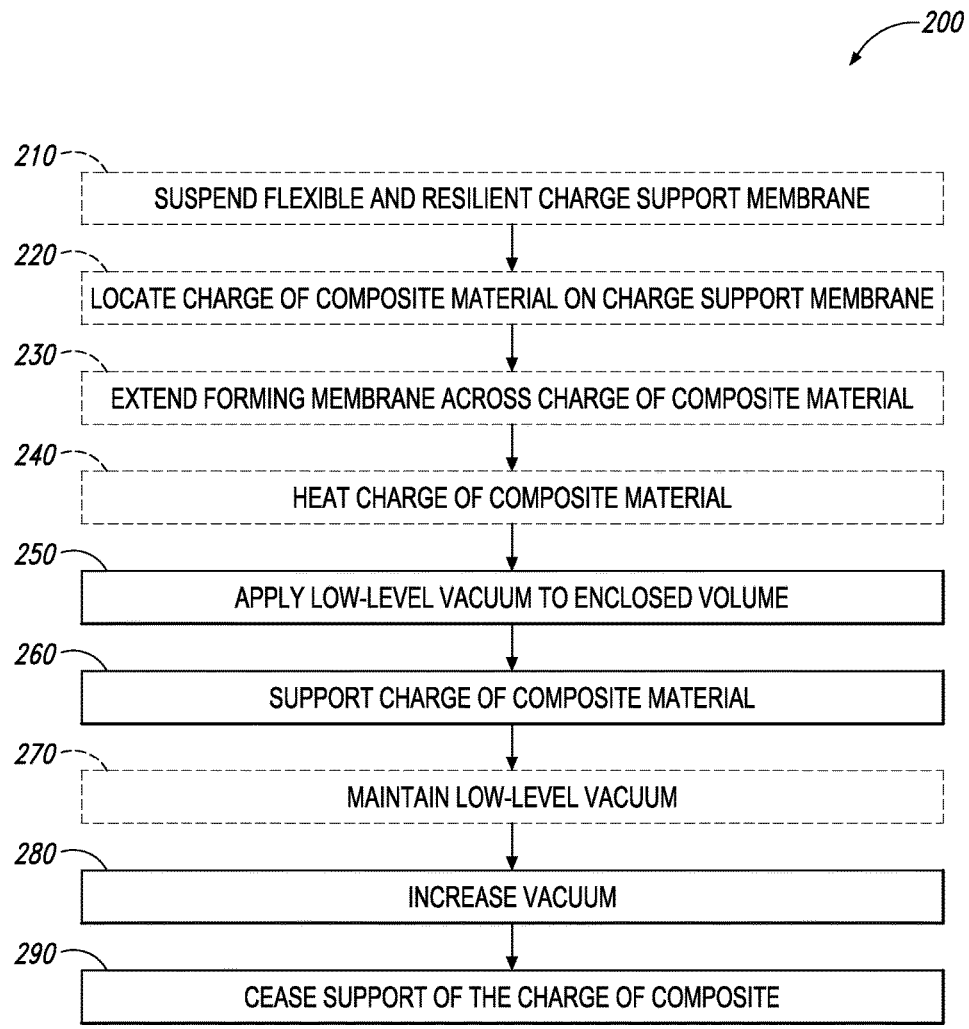
FIG. 7 is a flowchart depicting methods, according to the present disclosure, for drape forming a charge of composite material.

FIG. 7 is a flowchart depicting methods 200, according to the present disclosure, for drape forming a charge of composite material that includes a plurality of plies of composite material. Methods 200 may include drape forming to define a non-planar surface contour of a composite part that includes the charge of composite material, such as composite part 800 of FIGS. 1-2.

Methods 200 may include suspending a flexible and resilient charge support membrane at 210, orienting a charge of composite material on the charge support membrane at 220, extending a forming membrane across the charge of composite material at 230, and/or heating the charge of composite material at 240. Methods 200 include applying a low-level vacuum to an enclosed volume at 250 and supporting the charge of composite material at 260. Methods 200 further may include maintaining the low-level vacuum at 270 and include increasing the vacuum at 280 and ceasing support of the charge of composite material at 290.

Suspending the flexible and resilient charge support membrane at 210 may include suspending with a release structure of a charge support structure. Examples of the release structure are disclosed herein with reference to release structure 130 of FIGS. 3-5. Examples of the charge support structure are disclosed herein with reference to charge support structure 100 of FIGS. 3-5. The suspending at 210 further may include suspending from a membrane suspension device, such as membrane suspension device 120 of FIGS. 3-5, suspending such that a first portion of the charge support membrane extends across at least a portion of a forming surface of a forming mandrel, and/or suspending such that a second portion of the charge support membrane extends away from the forming surface. The suspending at 210 may be performed prior to the extending at 230, prior to the orienting at 220, prior to the heating at 240, and/or prior to the applying at 250. The suspending at 210 further may include tensioning the charge support membrane, such as via the release structure, with the membrane suspension device.

Orienting the charge of composite material on the charge support membrane at 220 may be performed prior to the extending at 230, prior to the heating at 240, and/or prior to the applying at 250. The orienting at 220 may include orienting the charge of composite material such that the charge support membrane extends between the charge of composite material and the forming surface. Additionally or alternatively, the orientating at 220 also may include orienting such that a first portion of the charge of composite material is supported, or directly supported, by both the forming surface and the charge support membrane, while a second portion of the charge of composite material extends away from the forming surface, is supported by the forming membrane, and/or is not supported, or directly supported, by the forming surface.

Extending the forming membrane across the charge of composite material at 230 may be performed prior to the heating at 240 and/or prior to the applying at 250. The extending at 230 may include extending from the charge support structure and/or extending to define, or to at least partially define, the enclosed volume.

Heating the charge of composite material at 240 may be performed prior to and/or concurrently with the applying at 250. The heating at 240 may include heating with a heating assembly, such as heating assembly 60 of FIGS. 3-5, and/or heating to a forming temperature. Examples of the forming temperature are disclosed herein. When methods 200 include the heating at 240, methods 200 further may include supporting the second portion of the charge of composite material with the charge support structure during the heating at 240 and/or prior to the ceasing at 290.

Applying the low-level vacuum to the enclosed volume at 250 may include applying the low-level vacuum to at least partially evacuate, or decrease a pressure within, the enclosed volume. Examples of the low-level vacuum are disclosed herein. As discussed in more detail herein with reference to enclosed volume 98 of FIGS. 3-5, the enclosed volume may be at least partially defined by a base and by the forming membrane.

The applying at 250 may include applying to partially deform the charge of composite material around an edge of the forming surface, and a magnitude of the low-level vacuum may be selected such that the charge of composite material is partially, but not completely, conformed to the forming surface responsive to application of the low-level vacuum to the enclosed volume. As an example, the edge may define an angle of curvature, such as angle of curvature 24 of FIG. 3, and the applying at 250 may include deforming the charge of composite material around a threshold fraction of the angle of curvature. Examples of the angle of curvature include angles of at least 30 degrees, at least 45 degrees, at least 60 degrees, at least 75 degrees, at least 90 degrees, and/or substantially 90 degrees. Examples of the threshold fraction of the angle of curvature include threshold fractions of at least 10 percent, at least 20 percent, at least 30 percent, at least 40 percent, at least 45 percent, at least 50 percent, and/or at least 60 percent of the angle of curvature. Additional examples of the threshold fraction of the angle of curvature include threshold fractions of less than 75 percent, less than 60 percent, less than 50 percent, less than 45 percent, and/or less than 50 percent of the angle of curvature.

It is within the scope of the present disclosure that the applying at 250 may include applying a constant, or at least substantially constant, low-level vacuum and/or maintaining the enclosed volume at a constant, or at least substantially constant, pressure. However, it is also within the scope of the present disclosure that the applying at 250 may include applying a varying, or time-varying, low-level vacuum that produces a varying, or time-varying, pressure within the enclosed volume.

Supporting the charge of composite material at 260 may be performed during the applying at 250 and/or during the maintaining at 270. The supporting at 260 may include supporting a first portion of the charge of composite material with the forming surface and/or supporting a second portion of the charge of composite material with the charge support structure. As discussed herein, the charge support structure may be separate from the forming surface and/or may extend away from the forming surface.

Stated another way, the supporting at 260 may include supporting a central region of the charge support membrane with the forming surface and supporting the first portion of the charge of composite material with the central region of the charge support membrane. The supporting at 260 further may include supporting a peripheral region of the charge support membrane with the membrane suspension device, such as via a release structure, and supporting the second portion of the charge of composite material with the peripheral region of the charge support membrane. Stated yet another way, the supporting at 260 may include maintaining a spatial separation between the second portion of the charge of composite material and the forming surface. Examples of the central region of the charge support membrane, the peripheral region of the charge support membrane, and the release structure are disclosed herein with reference to FIGS. 3-5.

Maintaining the low-level vacuum at 270 may be performed subsequent to the applying at 250 and/or prior to the increasing at 280. The maintaining at 270 may include maintaining the low-level vacuum for at least a threshold holding time, such as to permit the plurality of plies of composite material within the charge of composite material to shear relative to one another. Examples of the threshold holding time are disclosed herein.

Increasing the vacuum at 280 may be performed subsequent to the suspending at 210, subsequent to the orienting at 220, subsequent to the extending at 230, subsequent to the heating at 240, subsequent to the applying at 250, and/or subsequent to the maintaining at 270. The increasing at 280 may include increasing a vacuum level within the enclosed volume from the low-level vacuum to a high-level vacuum. The high-level vacuum may be greater than (i.e., may have a lower pressure than) the low-level vacuum, and examples of the high-level vacuum are disclosed herein.

The increasing at 280 may include increasing to further deform the charge of composite material, to deform the charge of composite material around the edge of the forming surface, to conform the charge of composite material to the forming surface, and/or to completely and/or entirely conform the charge of composite material to the forming surface. It is within the scope of the present disclosure that the increasing at 280 may include ramping at a specified, defined, and/or predetermined ramp rate, examples of which are disclosed herein. The increasing at 280 also may include increasing a tension within the charge support membrane.

Ceasing support of the charge of composite material at 290 may be responsive to the increasing at 280. The ceasing at 290 may include ceasing support of the second portion of the charge of composite material with the charge support structure. Additionally or alternatively, the ceasing at 290 may include ceasing to permit the charge of composite material to conform, or to completely conform, to the forming surface.

The ceasing at 290 may be accomplished in any suitable manner. As an example, the ceasing at 290 may include separating a first portion of the charge support structure from a second portion of the charge support structure. As a more specific example, the ceasing at 290 may include separating the charge support membrane from the membrane suspension device of the charge support structure. As yet another example, the ceasing at 290 may include releasing the charge support membrane from the membrane suspension device with, via, via operation of, and/or via actuation of the release structure. As additional more specific examples, the releasing may include shearing an adhesive and/or tearing the charge support membrane. The ceasing at 290 may be initiated responsive to a tension within the charge support membrane being greater than a threshold tension.

Figure 8:
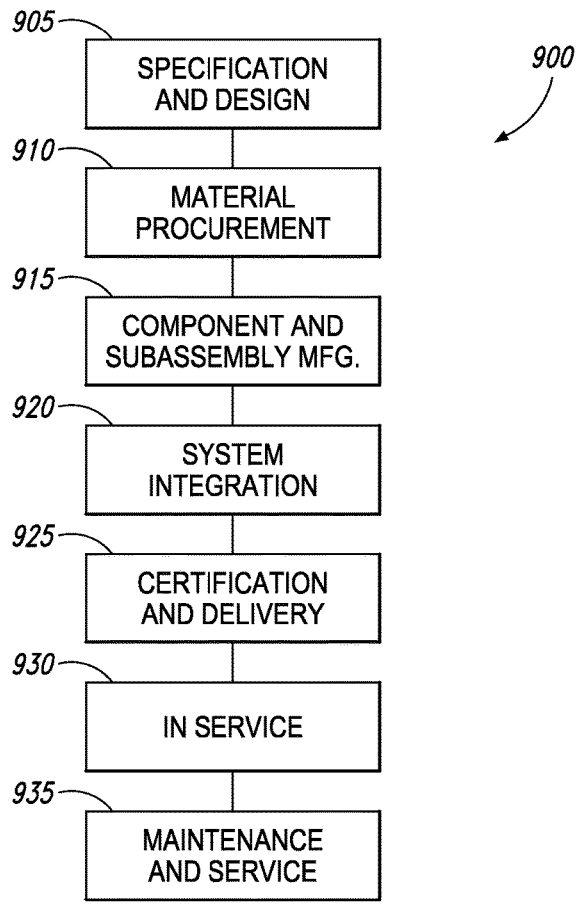
FIG. 8 is a flow diagram of aircraft production and service methodology.
Figure 9:
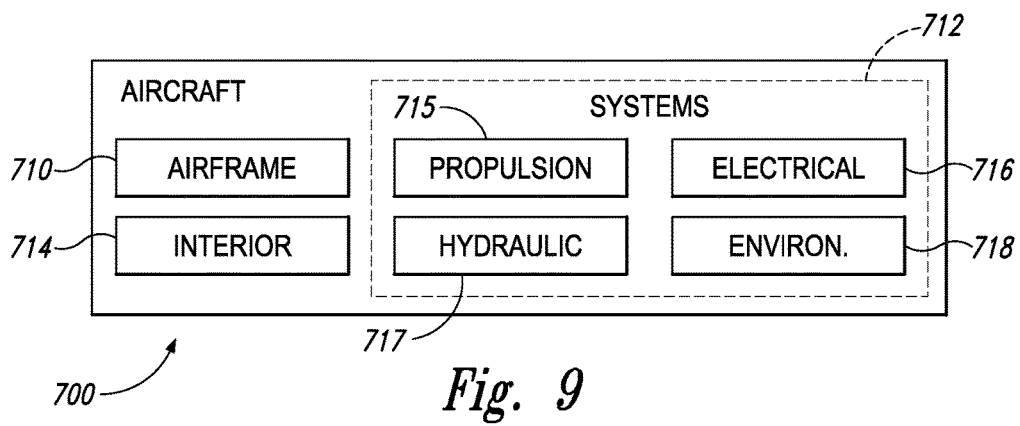
FIG. 9 is a block diagram of an aircraft.

Referring now to FIGS. 8-9, embodiments of the disclosure may be described in the context of an aircraft manufacturing and service method 900, as shown in FIG. 8, and an aircraft 700, as shown in FIG. 9. During pre-production, exemplary method 900 may include specification and design 905 of the aircraft 700 and material procurement 910. During production, component and subassembly manufacturing 915 and system integration 920 of the aircraft 700 take place. Thereafter, the aircraft 700 may go through certification and delivery 925 in order to be placed in service 930. While in service by a customer, the aircraft 700 is scheduled for routine maintenance and service 935 (which also may include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 9, the aircraft 700 produced by exemplary method 900 may include an airframe 710 with a plurality of systems 712 and an interior 714. Examples of high-level systems 712 include one or more of a propulsion system 715, an electrical system 716, a hydraulic system 717, and an environmental system 718. Any number of other systems may be included. Although an aerospace example is shown, the principles of the invention may be applied to other industries, such as the automotive industry.

Systems and methods embodied herein may be employed during any one or more of the stages of the manufacturing and service method 900. For example, components or subassemblies corresponding to component and subassembly manufacturing process 915 may be fabricated or manufactured in a manner similar to components or subassemblies produced while the aircraft 700 is in service. Also, one or more system embodiments, method embodiments, or a combination thereof may be utilized during the production stages 915 and 920, for example, by substantially expediting assembly of or reducing the cost of an aircraft 700. Similarly, one or more of system embodiments, method embodiments, or a combination thereof may be utilized while the aircraft 700 is in service, for example and without limitation, to maintenance and service 935.

Examples of inventive subject matter according to the present disclosure are described in the following enumerated paragraphs:

A1. A system for drape forming a charge of composite material to define a non-planar surface contour of a composite part that includes the charge of composite material, the system comprising:

a forming mandrel including a forming surface shaped to correspond to the surface contour of the composite part;

a charge support structure that includes:

(i) a flexible and resilient charge support membrane configured to at least temporarily and operatively support the charge of composite material during drape forming thereof, wherein a central region of the charge support membrane extends across at least a portion of the forming surface;

(ii) a membrane suspension device configured to at least temporarily suspend a peripheral region of the charge support membrane; and (iii) a release structure configured to operatively couple the charge support membrane to the membrane suspension device when a tension on the peripheral region of the charge support membrane is less than a threshold tension and to release the charge support membrane from the membrane suspension device when the tension is greater than the threshold tension;

a flexible and resilient forming membrane extending across at least a portion of the charge support membrane;

a base supporting the forming mandrel and the charge support structure, wherein the base and the forming membrane at least partially define an enclosed volume that contains the forming surface, at least a portion of the charge support membrane, and at least a portion of the release structure and that is configured to contain the charge of composite material; and a vacuum source configured to selectively apply a vacuum to the enclosed volume.

A2. The system of paragraph A1, wherein the charge support membrane is at least one of an elastomeric charge support membrane and a polymeric charge support membrane.

A3. The system of any of paragraphs A1-A2, wherein the system is configured to permit fluid flow between a side of the charge support membrane that faces the forming surface and a side of the charge support membrane that faces the charge of composite material.

A4. The system of any of paragraphs A1-A3, wherein the charge support membrane is a perforated charge support membrane.

A5. The system of any of paragraphs A1-A4, wherein the charge support membrane is a gas-permeable charge support membrane.

A6. The system of any of paragraphs A1-A5, wherein the charge support membrane is formed from a charge support membrane material that is selected to permit direct physical contact with the charge of composite material without at least one of damage to the charge of composite material and contamination of the charge of composite material.

A7. The system of any of paragraphs A1-A6, wherein the charge support membrane is a charge support film, and optionally a thin charge support film.

A8. The system of any of paragraphs A1-A7, wherein the membrane suspension device includes a rigid membrane suspension body.

A9. The system of paragraph A8, wherein the rigid membrane suspension body extends a body distance from the base, and further wherein the forming mandrel extends a mandrel distance from the base.

A10. The system of paragraph A9, wherein the body distance is at least as large as the mandrel distance.

A11. The system of any of paragraphs A9-A10, wherein the body distance is within a threshold distance difference of the mandrel distance, optionally wherein the threshold distance difference is less than 5 percent of the mandrel distance, less than 10 percent of the mandrel distance, less than 15 percent of the mandrel distance, or less than 20 percent of the mandrel distance.

A12. The system of any of paragraphs A8-A11, wherein the release structure operatively couples, and optionally directly operatively couples, the charge support membrane to the rigid membrane suspension body when the tension is less than the threshold tension.

A13. The system of any of paragraphs A1-A12, wherein the membrane suspension device includes a flexible extension region that extends toward the forming mandrel, optionally wherein the flexible extension region extends from a/the rigid membrane suspension body.

A14. The system of paragraph A13, wherein the release structure operatively couples, and optionally directly operatively couples, the charge support membrane to the flexible extension region when the tension is less than the threshold tension.

A15. The system of any of paragraphs A1-A14, wherein the membrane suspension device is configured to permit fluid communication between a portion of the enclosed volume that extends between the charge support membrane and the forming membrane and a portion of the enclosed volume that extends between the charge support membrane and the base.

A16. The system of any of paragraphs A1-A15, wherein the membrane suspension device and the release structure together are configured to maintain the charge support membrane in tension when the tension on the peripheral region is less than the threshold tension.

A17. The system of any of paragraphs A1-A16, wherein, prior to application of the vacuum to the enclosed volume, the charge support membrane includes an unsupported region, which supports the charge of composite material and does not extend across the portion of the forming surface, and further wherein the membrane suspension device and the release structure together are configured to maintain the unsupported region within a threshold distance of being coplanar with the central region of the charge support membrane.

A18. The system of paragraph A17, wherein the threshold distance is less than 1 centimeter (cm), less than 2 cm, less than 3 cm, less than 4 cm, or less than 5 cm.

A19. The system of any of paragraphs A1-A18, wherein the release structure includes a separate structure that is distinct from the charge support membrane and from the membrane suspension device.

A20. The system of any of paragraphs A1-A19, wherein the release structure includes an adhesive surface that operatively couples the charge support membrane to the membrane suspension device, wherein the adhesive is configured to permit separation of the charge support membrane from the membrane suspension device responsive to the tension being greater than the threshold tension.

A21. The system of any of paragraphs A1-A20, wherein the release structure forms a portion of the charge support membrane.

A22. The system of any of paragraphs A1-A21, wherein the release structure includes the peripheral region of the charge support membrane, wherein the peripheral region is configured to tear responsive to the tension being greater than the threshold tension.

A23. The system of paragraph A22, wherein the peripheral region includes a plurality of failure points, and further wherein the peripheral region is configured to tear along the plurality of failure points.

A24. The system of any of paragraphs A22-A23, wherein the peripheral region includes a plurality of perforations.

A25. The system of any of paragraphs A1-A24, wherein the release structure forms a portion of the membrane suspension device.

A26. The system of paragraph A25, wherein the release structure is a mechanical release structure.

A27. The system of any of paragraphs A1-A26, wherein the system further includes a heating assembly configured to selectively heat the charge of composite material to a forming temperature.

A28. The system of paragraph A27, wherein the heating assembly includes a heat blanket.

A29. The system of paragraph A28, wherein the heat blanket extends across the forming membrane such that the forming membrane extends between the charge of composite material and the heat blanket.

A30. The system of any of paragraphs A27-A29, wherein the heating assembly includes at least one of a heat lamp, a mandrel heating assembly, and/or a fluid heating assembly.

A31. The system of any of paragraphs A27-A30, wherein the heating assembly includes a temperature controller configured to regulate a temperature of the charge of composite material at the forming temperature.

A32. The system of paragraph A31, wherein the temperature controller includes a temperature detector configured to measure the temperature of the charge of composite material, optionally wherein the temperature controller includes a plurality of temperature detectors, and further optionally wherein the temperature detector includes at least one of a thermocouple and a resistance temperature detector.

A33. The system of any of paragraphs A27-A32, wherein the forming temperature is at least 30° C., at least 35° C., at least 40° C., at least 45° C., at least 50° C., at least 55° C., or at least 60° C.

A34. The system of any of paragraphs A27-A33, wherein the forming temperature is less than 400° C., less than 350° C., less than 300° C., less than 250° C., less than 200° C., less than 150° C., less than 140° C., less than 130° C., less than 120° C., less than 110° C., less than 100° C., less than 90° C., less than 80° C., less than 70° C., less than 65° C., less than 60° C., less than 55° C., less than 50° C., or less than 45° C.

A35. The system of any of paragraphs A1-A34, wherein the system includes the charge of composite material.

A36. The system of any of paragraphs A1-A35, wherein, when the system is forming the charge of composite material, the charge support membrane extends between the charge of composite material and the forming surface.

A37. The system of any of paragraphs A1-A36, wherein, when the system is forming the charge of composite material, the charge support membrane is in direct physical contact with the charge of composite material.

A38. The system of any of paragraphs A1-A37, wherein, when the system is forming the charge of composite material, the charge of composite material extends at least partially between the charge support membrane and the forming membrane.

A39. The system of any of paragraphs A1-A38, wherein, when the system is forming the charge of composite material, the charge of composite material does not extend entirely across the charge support membrane.

A40. The system of any of paragraphs A1-A39, wherein a low-level vacuum, optionally which is less than a high-level vacuum, is applied to the enclosed volume, wherein a first portion of the charge of composite material is at least partially deformed around an edge of the forming surface, wherein the release structure is coupled to the charge support membrane, and further wherein a second portion of the charge of composite material extends away from the forming surface and is supported by the charge support membrane.

A41. The system of paragraph A40, wherein the low-level vacuum is one of at least 0.5 kilopascals (kPa), at least 1 kPa, at least 1.5 kPa, at least 2 kPa, at least 2.5 kPa, at least 3 kPa, at least 3.5 kPa, at least 4 kPa, at least 5 kPa, at least 6 kPa, or at least 7 kPa.

A42. The system of any of paragraphs A40-A41, wherein the low-level vacuum is less than 20 kPa, less than 18 kPa, less than 16 kPa, less than 14 kPa, less than 12 kPa, less than 10 kPa, less than 8 kPa, less than 7 kPa, less than 6 kPa, less than 5 kPa, or less than 4 kPa.

A43. The system of any of paragraphs A1-A42, wherein a high-level vacuum, optionally which is greater than a low-level vacuum, is applied to the enclosed volume, wherein the charge of composite material is conformed to the forming surface, and further wherein the release structure has released the charge support membrane from the membrane suspension device.

A44. The system of paragraph A43, wherein the high-level vacuum is at least 30 kilopascals (kPa), at least 40 kPa, at least 50 kPa, at least 60 kPa, at least 70 kPa, at least 80 kPa, at least 90 kPa, or at least 100 kPa.

A45. The system of any of paragraphs A1-A44, wherein the charge of composite material includes a plurality of plies of composite material, optionally wherein the charge of composite material is a layered charge of composite material that includes the plurality of plies of composite material.

A46. The system of paragraph A45, wherein the plurality of plies of composite material includes at least 5, at least 10, at least 20, at least 40, at least 60, at least 80, or at least 100 plies of composite material.

A47. The system of any of paragraphs A45-A46, wherein the plurality of plies of composite material includes fewer than 200, fewer than 180, fewer than 160, fewer than 140, fewer than 120, fewer than 100, fewer than 80, or fewer than 60 plies of composite material.

A48. The system of any of paragraphs A45-A47, wherein the plurality of plies of composite material is coextensive, or at least substantially coextensive, prior to the charge of composite material being conformed to the forming surface.

A49. The system of any of paragraphs A45-A48, wherein the forming surface includes an upper surface and an edge that extends from the upper surface, wherein the system is configured to conform the charge of composite material to the upper surface and to the edge, and further wherein the charge of composite material includes a tapered region that is configured to conform to the edge.

A50. The system of paragraph A49, wherein a number of plies of composite material within the tapered region progressively decreases around the edge.

A51. The system of any of paragraphs A1-A50, wherein the charge of composite material includes at least one of a fiberglass, a fiberglass cloth, a carbon fiber, a carbon fiber cloth, a cloth, a pre-impregnated (pre-preg) composite material, a resin material, a thermos-set resin material, a cyanate ester, a phenolic material, a thermoplastic, and an epoxy.

A52. The system of any of paragraphs A1-A51, wherein the system further includes a release film that extends between the forming membrane and the charge of composite material.

A53. The system of paragraph A52, wherein the release film is in direct physical contact with the charge of composite material.

A54. The system of any of paragraphs A52-A53, wherein the release film is selected to permit direct physical contact with the charge of composite material without at least one of damage to the charge of composite material and contamination of the charge of composite material.

A55. The system of any of paragraphs A52-A54, wherein the release film includes a fluoropolymer film.

A56. The system of any of paragraphs A1-A55, wherein the vacuum source is configured to provide a range of vacuum levels to the enclosed volume.

A57. The system of paragraph A56, wherein the range of vacuum levels include at least a/the low-level vacuum and a/the high-level vacuum.

A58. The system of any of paragraphs A1-A57, wherein the vacuum source is configured to progressively increase the vacuum between a/the low-level vacuum and a/the high-level vacuum.

A59. The system of paragraph A58, wherein the vacuum source is configured to ramp the vacuum at a ramp rate of at least 5 kilopascals per minute (kPa/min), at least 6 kPa/min, at least 7 kPa/min, at least 8 kPa/min, at least 9 kPa/min, at least 10 kPa/min, at least 11 kPa/min, at least 12 kPa/min, at least 13 kPa/min, at least 14 kPa/min, or at least 15 kPa/min.

A60. The system of any of paragraphs A58-A59, wherein the vacuum source is configured to ramp the vacuum at a/the ramp rate of less than 100 kPa/min, less than 90 kPa/min, less than 80 kPa/min, less than 70 kPa/min, less than 60 kPa/min, less than 50 kPa/min, less than 40 kPa/min, less than 30 kPa/min, less than 20 kPa/min, less than 18 kPa/min, less than 16 kPa/min, less than 14 kPa/min, less than 12 kPa/min, or less than 10 kPa/min.

A61. The system of any of paragraphs A1-A60, wherein the vacuum source is configured to maintain the vacuum at a given vacuum level for at least a threshold holding time.

A62. The system of paragraph A61, wherein the threshold holding time is at least 30 seconds, at least 45 seconds, at least 1 minute, at least 2 minutes, at least 3 minutes, at least 4 minutes, at least 5 minutes, or at least 6 minutes.

A63. The system of any of paragraphs A61-A63, wherein the threshold holding time is less than 10 minutes, less than 9 minutes, less than 8 minutes, less than 7 minutes, less than 6 minutes, less than 5 minutes, less than 4 minutes, or less than 3 minutes.

A64. The system of any of paragraphs A1-A63, wherein the forming membrane is an elastomeric forming membrane.

A65. The system of any of paragraphs A1-A64, wherein the forming membrane is a vacuum bag.

A66. The system of any of paragraphs A1-A65, wherein the forming membrane is fluid-impervious, or at least substantially fluid-impervious.

A67. The system of any of paragraphs A1-A66, wherein the forming mandrel is an elongate forming mandrel.

A68. The system of any of paragraphs A1-A67, wherein the forming surface is an elongate forming surface.

A69. The system of any of paragraphs A1-A68, wherein the forming surface is an arcuate forming surface.

A70. The system of any of paragraphs A1-A69, wherein the forming surface is a non-planar forming surface.

A71. The system of any of paragraphs A1-A70, wherein the forming surface includes a planar, or at least substantially planar, region and an arcuate region that extends from the planar region.

A72. The system of paragraph A71, wherein the arcuate region extends toward the base from the planar region.

A73. The system of any of paragraphs A71-A72, wherein the arcuate region has a radius of curvature of less than 1 cm, less than 2 cm, less than 3 cm, less than 4 cm, less than 5 cm, less than 6 cm, less than 8 cm, less than 10 cm, less than 15 cm, or less than 20 cm.

A74. The system of any of paragraphs A71-A73, wherein the arcuate region has an angle of curvature of at least 30 degrees, at least 45 degrees, at least 60 degrees, at least 75 degrees, at least 90 degrees, or substantially 90 degrees.

A75. The system of any of paragraphs A1-A74, wherein the base is separate from and operatively attached to the forming mandrel and the charge support structure.

A76. The system of any of paragraphs A1-A75, wherein the base forms a portion of at least one, and optionally both, of the forming mandrel and the membrane suspension device.

A77. The system of any of paragraphs A1-A76, wherein the base is a rigid, or at least substantially rigid base.

B1. A system for drape forming a charge of composite material to define a non-planar surface contour of a composite part that includes the charge of composite material, the system comprising:

a forming mandrel including a forming surface shaped to correspond to the surface contour of the composite part;

a means for supporting the charge of composite material, wherein the means for supporting the charge of composite material includes a flexible and resilient charge support membrane, and further wherein the means for supporting the charge of composite material is configured to support the charge of composite material when a tension on a peripheral region of the charge support membrane is less than a threshold tension and to permit the charge of composite material to conform to the forming surface when the tension is greater than the threshold tension;

a flexible and resilient forming membrane extending across at least a portion of the charge support membrane;

a base supporting the forming mandrel and the means for supporting the charge of composite material, wherein the base and the forming membrane at least partially define an enclosed volume that contains the forming surface, the charge of composite material, and at least a portion of the means for supporting the charge of composite material; and a vacuum source configured to selectively apply a vacuum to the enclosed volume.

B2. The system of paragraph B1 including any suitable structure of any suitable portion of the system of any of paragraphs A1-A74.

C1. A method of drape forming a charge of composite material, which includes a plurality of plies of composite material, to define a non-planar surface contour of a composite part that includes the charge of composite material, the method comprising:

applying a low-level vacuum to an enclosed volume that is at least partially defined by a base and by a flexible and resilient forming membrane to partially deform the charge of composite material around an edge of a forming surface, which is defined by a forming mandrel;

during the applying, supporting a first portion of the charge of composite material with the forming surface and supporting a second portion of the charge of composite material with a charge support structure that is separate from the forming surface and that extends away from the forming surface;

increasing a vacuum level within the enclosed volume from the low-level vacuum to a high-level vacuum, which is greater than the low-level vacuum, to conform the charge of composite material to the forming surface; and at least partially responsive to the increasing, ceasing the supporting the second portion of the charge of composite material with the charge support structure to permit the charge of composite material to conform, or completely conform, to the forming surface.

C2. The method of paragraph C1, wherein, prior to the applying, the method further includes heating the charge of composite material, with a heating assembly, to a forming temperature.

C3. The method of paragraph C2, wherein the forming temperature is at least 30° C., at least 35° C., at least 40° C., at least 45° C., at least 50° C., at least 55° C., or at least 60° C.

C4. The method of any of paragraphs C2-C3, wherein the forming temperature is less than 400° C., less than 350° C., less than 300° C., less than 250° C., less than 200° C., less than 150° C., less than 140° C., less than 130° C., less than 120° C., less than 110° C., less than 100° C., less than 90° C., less than 80° C., less than 70° C., less than 65° C., less than 60° C., less than 55° C., less than 50° C., or less than 45° C.

C5. The method of any of paragraphs C2-C4, wherein the method includes supporting the second portion of the charge of composite material with the charge support structure during the heating.

C6. The method of any of paragraphs C1-05, wherein the applying includes partially deforming the charge of composite material around the edge.

C7. The method of paragraph C6, wherein the edge defines an angle of curvature, and further wherein the deforming includes deforming the charge of composite material around a threshold fraction of the angle of curvature.

C8. The method of paragraph C7, wherein the angle of curvature is at least 30 degrees, at least 45 degrees, at least 60 degrees, at least 75 degrees, at least 90 degrees, or substantially 90 degrees.

C9. The method of any of paragraphs C7-C8, wherein the threshold fraction of the angle of curvature is at least 10 percent, at least 20 percent, at least 30 percent, at least 40 percent, at least 45 percent, at least 50 percent, or at least 60 percent of the angle of curvature.

C10. The method of any of paragraphs C7-C9, wherein the threshold fraction of the angle of curvature is less than 75 percent, less than 60 percent, less than 50 percent, less than 45 percent, or less than 50 percent of the angle of curvature.

C11. The method of any of paragraphs C1-C10, wherein the low-level vacuum is at least one of:

(i) at least 0.5 kilopascals (kPa), at least 1 kPa, at least 1.5 kPa, at least 2 kPa, at least 2.5 kPa, at least 3 kPa, at least 3.5 kPa, at least 4 kPa, at least 5 kPa, at least 6 kPa, or at least 7 kPa; and (ii) less than 20 kPa, less than 18 kPa, less than 16 kPa, less than 14 kPa, less than 12 kPa, less than 10 kPa, less than 8 kPa, less than 7 kPa, less than 6 kPa, less than 5 kPa, or less than 4 kPa.

C12. The method of any of paragraphs C1-C11, wherein the high-level vacuum is at least 30 kilopascals (kPa), at least 40 kPa, at least 50 kPa, at least 60 kPa, at least 70 kPa, at least 80 kPa, at least 90 kPa, or at least 100 kPa.

C13. The method of any of paragraphs C1-C12, wherein the applying the low-level vacuum includes applying a constant, or at least substantially constant, vacuum.

C14. The method of any of paragraphs C1-C13, wherein the applying the low-level vacuum includes applying a varying low-level vacuum.

C15. The method of any of paragraphs C1-C14, wherein, subsequent to the applying and prior to the increasing, the method further includes maintaining the low-level vacuum for a least a threshold holding time to permit the plurality of plies of composite material to shear relative to one another within the charge of composite material.

C16. The method of paragraph C15, wherein the threshold holding time is at least 30 seconds, at least 45 seconds, at least 1 minute, at least 2 minutes, at least 3 minutes, at least 4 minutes, at least 5 minutes, or at least 6 minutes.

C17. The method of any of paragraphs C15-C16, wherein the threshold holding time is less than 10 minutes, less than 9 minutes, less than 8 minutes, less than 7 minutes, less than 6 minutes, less than 5 minutes, less than 4 minutes, or less than 3 minutes.

C18. The method of any of paragraphs C1-C17, wherein the supporting includes maintaining a spatial separation between the second portion of the charge of composite material and the forming surface.

C19. The method of any of paragraphs C1-C18, wherein the supporting includes supporting with a flexible and resilient charge support membrane of the charge support structure.

C20. The method of any of paragraphs C1-C19, wherein the increasing includes decreasing a pressure within the enclosed volume at a ramp rate of at least 5 kilopascals per minute (kPa/min), at least 6 kPa/min, at least 7 kPa/min, at least 8 kPa/min, at least 9 kPa/min, at least 10 kPa/min, at least 11 kPa/min, at least 12 kPa/min, at least 13 kPa/min, at least 14 kPa/min, or at least 15 kPa/min.

C21. The method of any of paragraphs C1-C20, wherein the increasing includes decreasing a pressure within the enclosed volume at a/the ramp rate of less than 100 kPa/min, less than 90 kPa/min, less than 80 kPa/min, less than 70 kPa/min, less than 60 kPa/min, less than 50 kPa/min, less than 40 kPa/min, less than 30 kPa/min, less than 20 kPa/min, less than 18 kPa/min, less than 16 kPa/min, less than 14 kPa/min, less than 12 kPa/min, or less than 10 kPa/min.

C22. The method of any of paragraphs C1-C21, wherein the increasing includes deforming the charge of composite material around the edge of the forming surface.

C23. The method of any of paragraphs C1-C22, wherein the increasing includes conforming, or completely conforming, the charge of composite material to the forming surface.

C24. The method of any of paragraphs C1-C23, wherein the ceasing includes separating a first portion of the charge support structure from a second portion of the charge support structure.

C25. The method of any of paragraphs C1-C24, wherein the ceasing includes separating a/the flexible and resilient charge support membrane of the charge support structure from a membrane suspension device of the charge support structure.

C26. The method of any of paragraphs C1-C25, wherein the ceasing includes releasing with a release structure.

C27. The method of paragraph C26, wherein the releasing includes shearing an adhesive.

C28. The method of any of paragraphs C26-C27, wherein the releasing includes tearing an/the flexible and resilient charge support membrane of the charge support structure.

C29. The method of any of paragraphs C26-C28, wherein the releasing includes releasing responsive to a tension within a/the flexible and resilient charge support membrane being greater than a threshold tension.

C30. The method of any of paragraphs C1-C29, wherein, prior to the applying, the method further includes suspending a/the flexible and resilient charge support membrane, with a/the release structure, from a/the membrane suspension device such that a first portion of the charge support membrane extends across at least a portion of the forming surface and also such that the second portion of the charge support membrane extends away from the forming surface.

C31. The method of paragraph C30, wherein the suspending includes tensioning the charge support membrane, via the release structure, with the membrane suspension device.

C32. The method of any of paragraphs C1-C30, wherein, prior to the applying, the method further includes orienting the charge of composite material on a/the charge support membrane, wherein the charge support membrane extends between the charge of composite material and the forming surface, wherein a first portion of the charge of composite material is supported by both the forming surface and the charge support membrane, and further wherein a second portion of the charge of composite material extends away from the forming surface and is supported by the forming membrane.

C33. The method of any of paragraphs C1-C32, wherein, prior to the applying, the method further includes extending the forming membrane across the charge of composite material to define the enclosed volume.

C34. The method of any of paragraphs C1-C33, wherein the method includes performing the method with any suitable structure of any suitable portion of the system of any of paragraphs A1-32.

As used herein, the terms "selective" and "selectively," when modifying an action, movement, configuration, or other activity of one or more components or characteristics of a system or method, mean that the specific action, movement, configuration, or other activity is a direct or indirect result of user manipulation of an aspect of, or one or more components of, the system or method.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of systems and steps of methods disclosed herein are not required to all systems and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed system or method. Accordingly, such inventive subject matter is not required to be associated with the specific systems and methods that are expressly disclosed herein, and such inventive subject matter may find utility in systems and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A system for drape forming a charge of composite material to define a non-planar surface contour of a composite part that includes the charge of composite material, the system comprising:
   a forming mandrel including a forming surface shaped to correspond to the non-planar surface contour of the composite part;
   a charge support structure that includes:
   (i) a flexible and resilient charge support membrane configured to at least temporarily and operatively support the charge of composite material during drape forming thereof, wherein a central region of the charge support membrane extends across at least a portion of the forming surface;
   (ii) a membrane suspension device configured to at least temporarily suspend a peripheral region of the charge support membrane; and
   (iii) a release structure configured to operatively couple the charge support membrane to the membrane suspension device when a tension on the peripheral region of the charge support membrane is less than a threshold tension and to release the charge support membrane from the membrane suspension device when the tension is greater than the threshold tension;
   a flexible and resilient forming membrane extending across at least a portion of the charge support membrane;
   a base supporting the forming mandrel and the charge support structure, wherein the base and the forming membrane at least partially define an enclosed volume that contains the forming surface, at least a portion of the charge support membrane, and at least a portion of the release structure and that is configured to contain the charge of composite material; and
   a vacuum source configured to selectively apply a vacuum to the enclosed volume;
   wherein the system is configured to permit fluid flow between a side of the charge support membrane that faces the forming surface and a side of the charge support membrane that faces the charge of composite material.

2. The system of claim 1, wherein the membrane suspension device includes a rigid membrane suspension body.

3. The system of claim 2, wherein the rigid membrane suspension body extends a body distance from the base, wherein the forming mandrel extends a mandrel distance from the base, and further wherein the body distance is at least as large as the mandrel distance.

4. The system of claim 2, wherein the rigid membrane suspension body extends a body distance from the base, wherein the forming mandrel extends a mandrel distance from the base, and further wherein the body distance is within a threshold distance difference of the mandrel distance, wherein the threshold distance difference is less than 20 percent of the mandrel distance.

5. The system of claim 1, wherein the charge of composite material defines a flange length, and further wherein a spacing between the membrane suspension device and the forming mandrel is at least 1.5 times larger than the flange length.

6. The system of claim 1, wherein the membrane suspension device includes a flexible extension region that extends toward the forming mandrel, wherein the flexible extension region extends from a rigid membrane suspension body, and further wherein the release structure operatively couples the charge support membrane to the flexible extension region when the tension is less than the threshold tension.

7. The system of claim 1, wherein the membrane suspension device and the release structure together are configured to maintain the charge support membrane in tension when the tension on the peripheral region is less than the threshold tension.

8. The system of claim 1, wherein the release structure includes an adhesive surface that operatively couples the charge support membrane to the membrane suspension device, wherein the adhesive surface is configured to permit separation of the charge support membrane from the membrane suspension device responsive to the tension being greater than the threshold tension.

9. The system of claim 1, wherein the release structure is at least partially defined by the charge support membrane.

10. The system of claim 1, wherein the release structure is at least partially defined by the membrane suspension device.

11. The system of claim 1, wherein the system further includes a heating assembly configured to selectively heat the charge of composite material to a forming temperature.

12. The system of claim 11, wherein the heating assembly includes a heat blanket.

13. The system of claim 11, wherein the heating assembly includes a temperature controller configured to regulate a temperature of the charge of composite material at the forming temperature.

14. The system of claim 1, wherein a low-level vacuum is applied to the enclosed volume, wherein a first portion of the charge of composite material is at least partially deformed around an edge of the forming surface, wherein the release structure is coupled to the charge support membrane, and further wherein a second portion of the charge of composite material extends away from the forming surface and is supported by the charge support membrane.

15. The system of claim 1, wherein a high-level vacuum is applied to the enclosed volume, wherein the charge of composite material is conformed to the forming surface, and further wherein the release structure has released the charge support membrane from the membrane suspension device.

16. The system of claim 1, wherein the vacuum source is configured to provide a range of vacuum levels to the enclosed volume, wherein the range of vacuum levels include at least a low-level vacuum and a high-level vacuum, wherein the high-level vacuum is greater than the low-level vacuum.

17. The system of claim 1, wherein the forming membrane is at least substantially fluid-impervious.

18. A system for drape forming a charge of composite material to define a non-planar surface contour of a composite part that includes the charge of composite material, the system comprising:
 a forming mandrel including a forming surface shaped to correspond to the non-planar surface contour of the composite part;
 a charge support structure that includes:
  (i) a flexible and resilient charge support membrane configured to at least temporarily and operatively support the charge of composite material during drape forming thereof, wherein a central region of the charge support membrane extends across at least a portion of the forming surface;
  (i) a membrane suspension device configured to at least temporarily suspend a peripheral region of the charge support membrane; and
  (iii) a release structure configured to operatively couple the charge support membrane to the membrane suspension device when a tension on the peripheral region of the charge support membrane is less than a threshold tension and to release the charge support membrane from the membrane suspension device when the tension is greater than the threshold tension, wherein the membrane suspension device and the release structure together are configured to maintain the charge support membrane in tension when the tension on the peripheral region is less than the threshold tension;
 a flexible and resilient forming membrane extending across at least a portion of the charge support membrane;
 a base supporting the forming mandrel and the charge support structure, wherein the base and the forming membrane at least partially define an enclosed volume that contains the forming surface, at least a portion of the charge support membrane, and at least a portion of the release structure and that is configured to contain the charge of composite material; and
 a vacuum source configured to selectively apply a vacuum to the enclosed volume.

19. The system of claim 18, wherein the forming membrane is at least substantially fluid-impervious.

20. A system for drape forming a charge of composite material to define a non-planar surface contour of a composite part that includes the charge of composite material, the system comprising:
 a forming mandrel including a forming surface shaped to correspond to the non-planar surface contour of the composite part;
 a charge support structure that includes:
  (i) a flexible and resilient charge support membrane configured to at least temporarily and operatively support the charge of composite material during drape forming thereof, wherein a central region of the charge support membrane extends across at least a portion of the forming surface;
  (ii) a membrane suspension device configured to at least temporarily suspend a peripheral region of the charge support membrane; and
  (iii) a release structure configured to operatively couple the charge support membrane to the membrane suspension device when a tension on the peripheral region of the charge support membrane is less than a threshold tension and to release the charge support membrane from the membrane suspension device when the tension is greater than the threshold tension;
 a flexible and resilient forming membrane extending across at least a portion of the charge support membrane, wherein the forming membrane is at least substantially fluid-impervious;
 a base supporting the forming mandrel and the charge support structure, wherein the base and the forming membrane at least partially define an enclosed volume that contains the forming surface, at least a portion of the charge support membrane, and at least a portion of the release structure and that is configured to contain the charge of composite material; and
 a vacuum source configured to selectively apply a vacuum to the enclosed volume.

* * * * *

UNITED STATES PATENT AND TRADEMARK OFFICE
CERTIFICATE OF CORRECTION

PATENT NO. : 10,195,796 B2
APPLICATION NO. : 14/883894
DATED : February 5, 2019
INVENTOR(S) : Michael Robert Anderson and John Michael Ligas It is certified that error appears in the above-identified patent and that said Letters Patent is hereby corrected as shown below:

In the Claims

Claim 18, Column 27, Line 25, "(i)" should read --(ii)--.

Signed and Sealed this
Twenty-sixth Day of March, 2019

Andrei Iancu
*Director of the United States Patent and Trademark Office*